US011969991B2

(12) United States Patent
Lo

(10) Patent No.: US 11,969,991 B2
(45) Date of Patent: Apr. 30, 2024

(54) DIRECTIONAL DRYING

(71) Applicant: Hewlett-Packard Development Company, L.P., Spring, TX (US)

(72) Inventor: Kevin Lo, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 70 days.

(21) Appl. No.: 17/795,319

(22) PCT Filed: Jan. 29, 2020

(86) PCT No.: PCT/US2020/015606
§ 371 (c)(1),
(2) Date: Jul. 26, 2022

(87) PCT Pub. No.: WO2021/154239
PCT Pub. Date: Aug. 5, 2021

(65) Prior Publication Data
US 2023/0144139 A1 May 11, 2023

(51) Int. Cl.
*B41J 11/00* (2006.01)

(52) U.S. Cl.
CPC ................................ *B41J 11/0022* (2021.01)

(58) Field of Classification Search
CPC ................................ B41J 11/0022; B41J 3/60
See application file for complete search history.

(56) References Cited

U.S. PATENT DOCUMENTS

| | | | | |
|---|---|---|---|---|
| 6,463,674 | B1 | 10/2002 | Meyers et al. | |
| 7,401,417 | B2 | 7/2008 | Rydell et al. | |
| 8,690,312 | B2 | 4/2014 | Tombs et al. | |
| 8,733,879 | B2 | 5/2014 | Numata | |
| 8,833,924 | B2 | 9/2014 | Velasco et al. | |
| 8,851,655 | B2 | 10/2014 | Velasco et al. | |
| 2010/0002063 | A1 | 1/2010 | Silverbrook et al. | |
| 2015/0367625 | A1* | 12/2015 | Ihme | B41F 3/52 101/424.1 |
| 2017/0320323 | A1 | 11/2017 | Perez et al. | |
| 2019/0084291 | A1 | 3/2019 | Franz et al. | |
| 2019/0202217 | A1 | 7/2019 | Yraceburu et al. | |

FOREIGN PATENT DOCUMENTS

| | | |
|---|---|---|
| EP | 2956305 B1 | 3/2019 |

* cited by examiner

*Primary Examiner* — Bradley W Thies
(74) *Attorney, Agent, or Firm* — Brooks, Cameron & Huebsch, PLLC

(57) ABSTRACT

An example device comprises a media path, a drying system, and a controller. The media path is divided into a plurality of distinct drying zones. The drying system includes a plurality of directionalities with relation to the plurality of distinct drying zones. And the controller is to select a directionality of the plurality of directionalities based on parameters of a print job.

15 Claims, 3 Drawing Sheets

DIRECTIONAL DRYING

BACKGROUND

Printing devices are a class of device capable of forming markings, such as text, images, and/or objects, on print media. The markings formed on print media may be two-dimensional (2D) in form or they may be three-dimensional (3D) in form, such as part of a 3D printed object. The printing devices may use fluid-based compounds to form markings, such as may contain colorants, particles, and/or dyes, by way of illustration. Drying mechanisms may be used to remove fluids while leaving colorants, particles, dyes, and the like behind.

BRIEF DESCRIPTION OF THE SEVERAL VIEWS OF THE DRAWINGS

Various examples will be described below by referring to the following figures.

Figure 1:
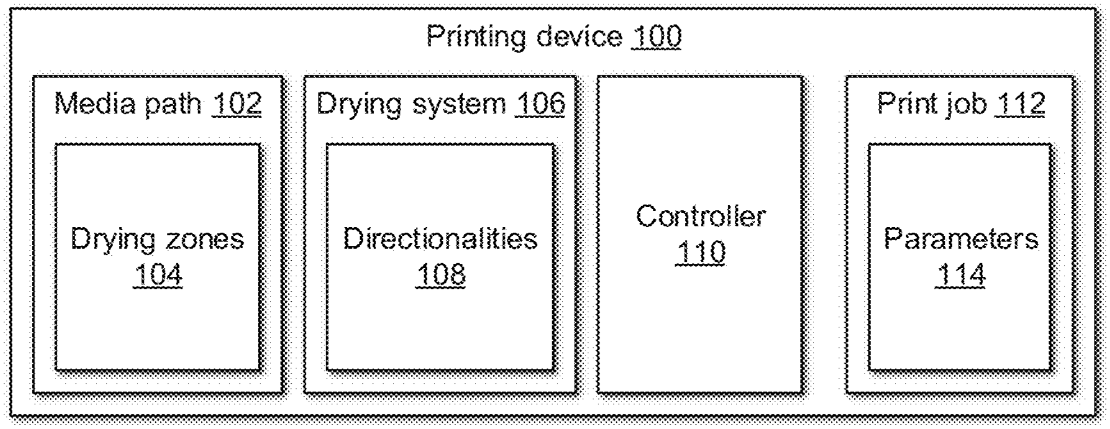
FIG. 1 is a block diagram illustrating an example device.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Some printing devices eject printing fluids onto print media to form markings (e.g., text, images, objects, etc.). Upon application to some print media, printing fluids may cause fibers to swell and/or otherwise become damaged resulting in media curl, cockle, and other like undesirable characteristics. Print media may be conditioned (e.g., stretched, heated, pressed, held, etc.) and dried using a drying and conditioning system. Through conditioning and drying, liquids may be removed from the print media and media curl and cockle mitigated, by way of example. The present description refers to the conditioning and drying of media (both singly and in combination) as “drying” for ease. Thus, reference to “drying” is intended to encompass conditioning unless expressly stated otherwise.

At times, drying of print media may result in over-dried print media. In a duplex print job example, by way of illustration, printing fluid may be applied to a first side of a print medium. Dry air may be blown on the first side to remove liquid from the surface of the medium as it advances past a duplex divert mechanism. A heated pressure roller may also be put into contact with the medium to further facilitate fluid removal. Upon passing the duplex divert mechanism, the medium may change direction and may be pulled back towards a duplex media path. Thus, drying and/or conditioning may occur from the print zone until the medium passes the duplex divert mechanism and then motion back past the duplex divert mechanism and to the duplex media path. If the medium is A4 size and traveling along the length of long dimension (297 mm), then an initial portion (e.g., the leading edge) of the medium may experience approximately 600 mm of drying (e.g., media motion in the first direction and then back towards the duplex media path). In contrast, on the second side of the print medium the corresponding initial portion (e.g., leading edge) of the medium may experience approximately 300 mm of drying. This unbalanced drying of surfaces and portions of print media may lead to undesirable output characteristics (e.g., media curl).

In another example, portions of a print job may have more printing fluid density than others. In such cases, standard drying and/or conditioning may be insufficient for the portions of the print media with densely deposited printing fluid; nevertheless, the standard drying and/or conditioning may lead to overdrying the other portions of the print media at which printing fluid has been less densely deposited.

With the foregoing examples in mind (by way of non-limiting illustration), the present description proposes dynamic media drying and/or conditioning based on parameters of a print job. Thus, for the case of a duplex print job, opposing surfaces of a print medium may be exposed to approximately equal amounts of drying energy. And for the case of a print medium with differing printing fluid densities, varying amounts of drying energy may be applied to sufficiently dry dense regions and avoid overdrying regions at which printing fluids are applied less densely.

FIG. 1 illustrates an example printing device 100 comprising a media path 102 with drying zones 104. Printing device 100 includes drying system 106 including directionalities 108. As noted above, the drying system 106 may include both drying and conditioning mechanisms (referred to as “drying mechanisms,” hereinafter), such as dryers and heated pressure rollers. Drying mechanisms are capable of applying drying energy to media in a variety of forms (e.g., contact-based drying, such as by way of a heated pressure roller) and in a variety of directions (e.g., towards a pre-divert drying zone, a post-divert drying zone, a duplex drying zone, etc.). This combination of drying forms and directions is referred to herein as “directionality” for ease of description.

Printing device 100 also has a controller 110. Controller 110 refers to a processing mechanism comprising a combination of hardware and/or software (but not software per se) capable of receiving instructions, such as in the form of signals or states, and executing the received instructions to enable functionality of the controller and/or other parts of the device (e.g., drying system 106). Example controllers include field-programmable gate arrays (FPGAs), application-specific integrated circuits (ASICs), and general-purpose processing units, by way of non-limiting example.

Controller 110 may receive signals (e.g., comprising instructions or data packets corresponding to a print job, like print job 112) from externally to printing device 100 (e.g., from a host or client device). Controller 110 may then process the received signals in order to trigger operation by printing device 100. To illustrate, in an example, an external host device may transmit a print job (e.g., print job 112) to printing device 100. The print job may be stored in memory and/or may be interpreted to form markings on print media in media path 102. For instance, controller 110 may determine that the print job is a duplex print job (e.g., markings on both sides of the print media). Controller 110 may also determine that a portion of the print job corresponds to higher printing liquid density value than other portions of the print job. Duplex/simplex and printing liquid density value are referred to more generally herein by the term “parameters.” The term “parameter” refers to a characteristic of a print job, such as simplex or duplex, color or black and white, dots-per-inch (dpi), print speed, and the like. Additionally, parameters of a print job may include characteristics of a portion of the print job, such as indications of coverage for a particular medium of a multi-page print job (e.g., a printing liquid density value).

Based on parameters 114, controller 110 may alter the functionality of printing device 100, such as by selecting a directionality of a number of directionalities 108. For instance, controller 110 may select a drying zone (of a number of drying zones 104) to receive drying energy (e.g., directing drying energy from one drying zone to another, directing drying energy towards multiple drying zones concurrently, moving drying energy between different drying zones consecutively, etc.). During drying of print media, different variations of directionalities may be selected, such as to achieve desired drying of print media. Returning to the above example of a duplex A4 print job, based on parameters 114 of print job 112, controller 110 may select a drying zone after a divert mechanism and then direct drying energy away from the post-divert drying zone while the print medium changes direction and moves back into a duplex media path. Alternatively, controller 110 may not provide any drying energy to the post-divert drying zone but instead direct drying energy to a duplex drying zone and then after the print media passes back through the print zone, provide drying energy along a number of drying zones approximately a same size and/or duration as the duplex drying zone. By so doing, exposure to drying energy on one side of the print medium will approximate drying energy applied to the second side of the print medium.

In another example in which one side of a duplex print job has a higher printing liquid density value than the other side, controller 110 may select directionalities 108 of drying system 106 such that a portion of the print job with the higher printing liquid density value is exposed to comparably more drying energy (e.g., the length of a pre-divert drying zone, a post-divert drying zone, and/or a duplex drying zone) than the other side of the print medium (e.g., only a post-divert drying zone). Further, in some cases, controller 110 may be capable of providing more or less drying energy to particular sub-portions of a page of a print job based on parameters 114 (e.g., increasing or decreasing an amount of drying energy applied to print media).

Additionally, based on parameters 114 of print job 112, controller 110 may select a directionality of directionalities 108, which may include selecting a form of drying energy. In one case, this may include selecting a non-contact-based form of drying energy, and in another case, selecting a contact-based form of drying energy. Yet other cases may include selection of multiple forms of drying energy. For instance, for the example of a print job 112 with a high printing liquid density value, controller 110 may direct application of both non-contact-based drying energy (e.g., an air-based dryer) and contact-based drying energy (e.g., a heated pressure roller). The contact-based drying energy may help reduce cockle. By contrast, in some cases, contact-based drying energy may overdry media with low printing liquid density values. Additionally, some fluids may respond more favorably to different forms of drying energy and may thus be favored. Etc.

With the foregoing in mind, an example device (e.g., print printing device 100) may include a media path (e.g., media path 102), a drying system (e.g., drying system 106), and a controller (e.g., controller 110). The media path is divided into a plurality of distinct drying zones (e.g., drying zones 104). The drying system includes a plurality of directionalities (e.g., directionalities 108) with relation to the plurality of distinct drying zones. For instance, in one example, one directionality may correspond to one drying zone and/or one form of drying energy. But in other examples, multiple drying zones may correspond to one directionality. The controller is to select a directionality of the plurality of directionalities based on parameters (e.g., parameters 114) of a print job (e.g., print job 112).

Figure 2:
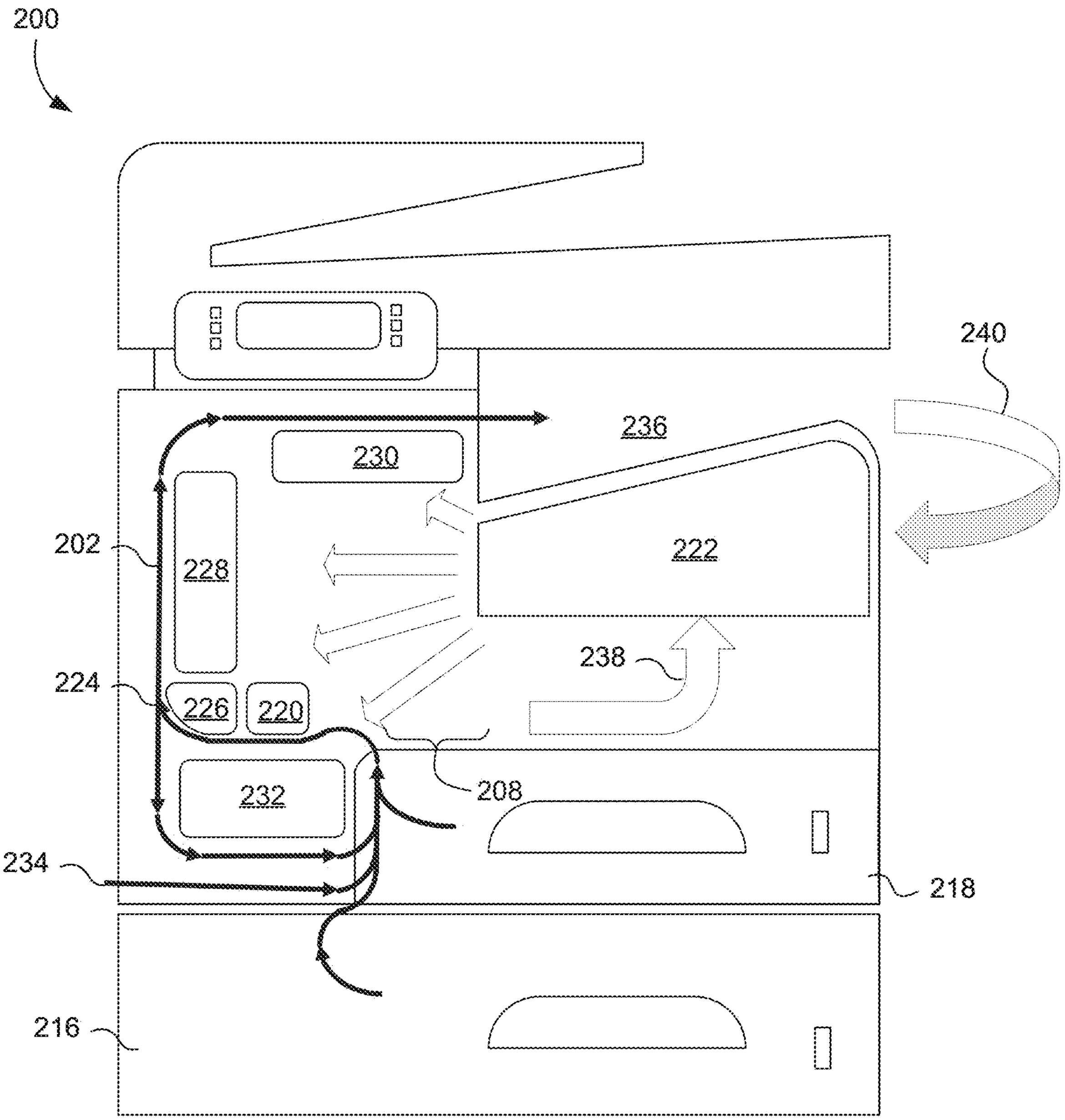
FIG. 2 is a schematic drawing of an example printing device.

FIG. 2 illustrates an example printing device 200 implementation consistent with the foregoing description. It is noted that like element numbers (e.g., media path 102 and media path 202) refer to similar components. Components with similar element numbers may be similar in structure and/or operation, though it is to be understood that particular aspects of one implementation are not necessarily to be read into other implementations. In this case, printing device 200 is illustrated as having a number of media input trays, a first media input tray 216 and a second media input tray 218. In this example, media input tray 216 and media input tray 218 may be for differently sized media (e.g., A3 and A4, respectively). A controller of print printing device 100 (e.g., controller 110 of FIG. 1) may direct the pick of print media based on parameters of a print job. For instance, a particular print job may be for A4 media, and the controller may direct the pick of a medium from media input tray 218 and feed the medium into the media path 202 (indicated by solid arrows and lines leading from media input tray 216, media input tray 218, and manual feed input 234, under print zone 220 and up and out into output tray 236. Media path 202 includes a duplex media path portion, which proceeds in a different direction at divert 224, and turns the medium over to present a different surface to a fluid ejection device of print zone 220. Divert 224 refers to a junction in media path 102 at which point media may be directed to one of multiple portions of media path 102. In some cases, divert 224 may include a flipper mechanism that changes a direction in which media moves along selected portions of media path 102 (see, e.g., the arrows moving in different directions above and below divert 224).

FIG. 2 illustrates a number of distinct drying zones arranged along media path 202. For instance, after print zone 220, there is a pre-divert drying zone 226. In some implementations, pre-divert drying zone 226 may be smaller or larger than what is shown in the example of FIG. 2. After divert 224, a post-divert drying zone 228 may be larger than pre-divert drying zone 226, such as to allow enough space for a print medium to advance and fully pass divert 224 before changing directions and moving into a duplex media path. As noted above, the leading edge of the print medium may be exposed to drying energy the length of post-divert drying zone 228 as the medium moves clear of divert 224 and then is again exposed to drying energy the length of post-divert drying zone 228 as the medium changes conveyance direction and engages the duplex media path (assuming, of course, that the medium is part of a duplex print job). In contrast, the trailing edge of the medium may only briefly receive drying energy as it passes divert 224. As noted, this may result in an unbalanced drying experience for the medium (e.g., at least partial overdrying of the leading edge as contrasted with drying of the trailing edge).

FIG. 2 also illustrates a drying system (e.g., drying system 106 of FIG. 1) that may include one or more drying mechanisms (e.g., drying mechanism 222). The drying mechanisms may include, by way of non-limiting example, non-contact-based drying mechanisms (e.g., heated and/or humidity-controlled air blowers, infrared (IR) light heaters, etc.) and contact-based drying mechanisms (e.g., heated pressure rollers). At times, drying mechanism 222 may also include conditioning mechanisms, such as may be used to stretch media and/or hold media in place while drying to allow swollen fibers to relax and thus potentially reduce the effects of liquid penetrating the media fibers.

Drying mechanism 222 also includes directionalities 208, illustrated as arrows radiating out from drying mechanism 222. In the case in which drying mechanism 222 includes an air-based dryer, directionalities 208 may include air conduits to direct heated and/or humidity-controlled air to a desired drying zone. The arrows refer to the directed heated and/or humidity-controlled air. In an example in which drying mechanism 222 includes an IR heater, the arrows radiating out from drying mechanism 222 refer to IR light being directed from a source towards desired drying zones. The arrows radiating from drying mechanism 222 refer to similar combinations of structure for other types of non-contact-based drying methods. In cases of contact-based drying, the arrows may represent the transmission of signals to control operation of the contact-based drying mechanisms. For instance, the signals may instruct a heated pressure roller to move into a position from which it may be able to apply heat and pressure to print media passing through a particular drying zone. An arrow is also included referring to air recirculation path 238. At times, there may be a desire to recycle air (such as to reduce an amount of energy to be applied to heat the air and/or to remove moisture from the air). Another arrow, referring to air 240, representing air that is external to printing device 100 is shown to indicate flow of air towards an air intake (in this case at a rear portion of printing device 200).

In operation, example printing device 200 may operate similarly to printing device 100 of FIG. 1. For instance, a controller may be capable of selecting directionality based on parameters of a print job. The device may include a plurality of distinct drying zones such as a pre-divert drying zone (e.g., pre-divert drying zone 226). And the controller may selectively activate and disactivate drying in the pre-divert drying zone based on a duplex parameter (or other such parameter) of the print job. In another example, in response to a duplex print job parameter indicative of a duplex print job, the controller may direct drying energy from a drying mechanism away from a post-divert drying zone (e.g., post-divert drying zone 228) for a portion of the print job. By way of example, the diverted drying energy may be directed to a duplex drying zone (e.g., duplex drying zone 232). The device may also include an eject drying zone (e.g., eject drying zone 230).

In some cases, the different distinct drying zones may have different respective sizes. For instance, in one example the a post-divert drying zone (e.g., post-divert drying zone 228) may be at least twice the length of a pre-divert drying zone (e.g., pre-divert drying zone 226).

Figure 3:
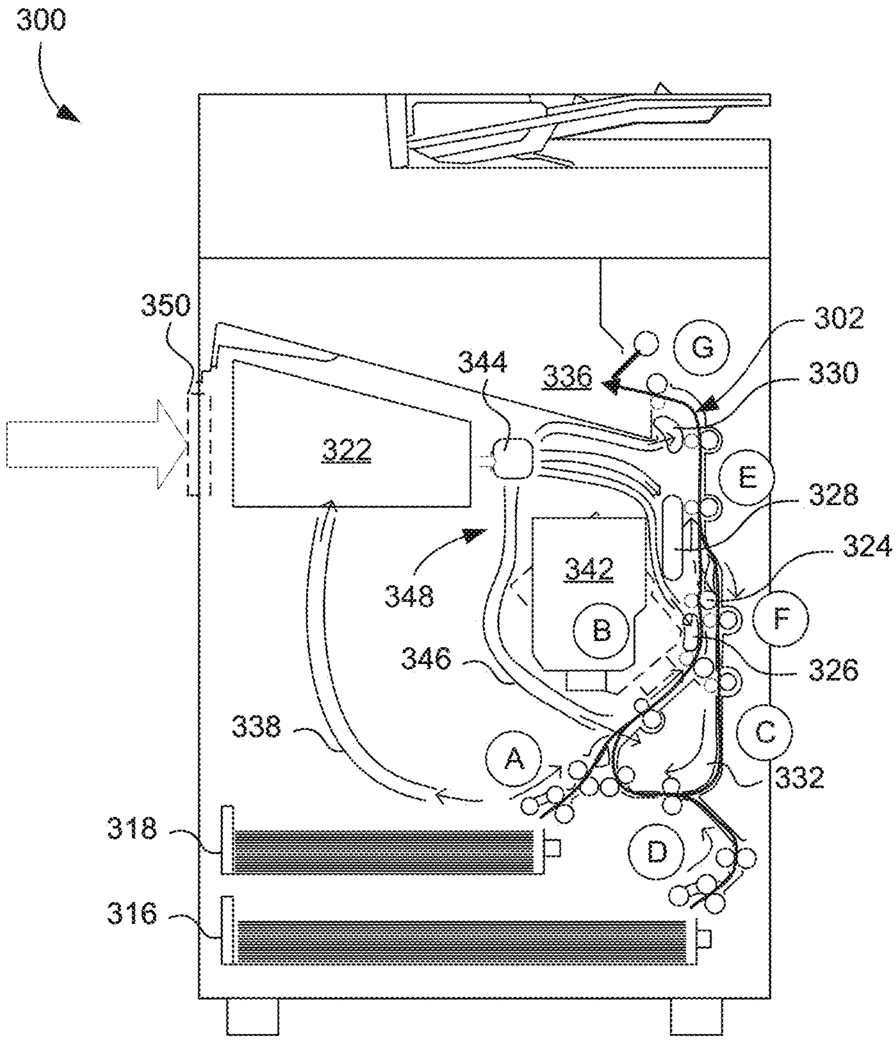
FIG. 3 illustrates an example printing device.

Moving on to FIG. 3, another example printing device 300 is illustrated having a different media path 302. Media path 302 is illustrated by heavy lines. Arrows are also included next to portions of media path 302 to indicated direction of media conveyance at those corresponding portions of media path 302. For instance, at A, an arrow indicates media leaving media input tray 318 and entering a branch of media path 302 that conveys media directly under a printhead 342 (e.g., a print zone). Alternatively, media may enter media path 302 from media input tray 316 as indicated by D and corresponding arrow before being conveyed to a print zone under printhead 342. At B, an arrow under printhead 342 (shown with a dashed line to indicate a positioning of printhead 342 in a print position as opposed to the solid line version of printhead 342 to indicate a maintenance/service position) illustrates that the media is to continue its conveyance upward toward output tray 336. Indeed, in a simplex print job (e.g., forming markings on but one side of a medium) media is conveyed as indicated at E and the corresponding arrow (just below the rollers on the lower left side of E) media is to continue upward to G and output tray 336.

If, however, printing device 300 receives a duplex print job, then as a medium passes divert 324 (illustrated with a solid line in a normal position and a dashed line in a duplex position) and movement of divert 324 to the duplex position (dashed line) the medium will change direction and engage the duplex portion of media path 302, as indicated by F and C and corresponding arrows. While on this portion of media path 302, drying and/or conditioning may be performed on media at duplex drying zone 332. Alternatively, such as in response to parameters of a print job, drying and conditioning may be disactivated at duplex drying zone 332.

Like the example printing device 200 of FIG. 2, FIG. 3 illustrates a number of drying zones. A pre-divert drying zone 326 is illustrated just prior to divert 324; a post-divert drying zone 328 is illustrated just after divert 324; an eject drying zone 330 is illustrated immediately prior to entering output tray 336; and a duplex drying zone 332 is illustrated as adjacent to a duplex portion of media path 302. Different drying zones may use a combination of different drying technologies. For example, eject drying zone 330 may include heated pressure rollers and/or heated blown air to accelerate drying. Other drying zones may have other combinations of drying technology. But a particular selection and placement of a drying mechanism may also take other factors into consideration. For instance, in an example in which UV-sensitive printing fluids are used, there may be a desire to place UV lamps in pre-divert drying zone 326 to enable prompt curing of the printing fluids. By way of further example, there may be a desire to place heated pressure rollers in eject drying zone 330 so that ejected media is warmed in much the same way that electrophotographic media is warmed. Etc.

FIG. 3 also illustrates a network of physical structures (e.g., physical representations of directionalities, discussed above) which schematically refer to directional structures 348, one of which is labeled as a directional structure 346. The additional directional structures of directional structures 348 are not labeled due to space constraints on the page but are represented by the three additional branches leaving valve 344, which is illustrated at the entrance of the directional structures 348. In one example, directional structures 348 comprise air conduits, which may be enclosed in a longitudinal direction and fluidically connected to valve 344 at one extremity and may open to a drying zone, such as one of pre-divert drying zone 326, post-divert drying zone 328, eject drying zone 330, and/or duplex drying zone 332, at the other extremity. In some examples, directional structures 348 may branch off each other and may include valve mechanisms (e.g., shutters, lenses, etc.) to allow drying energy to be split off of one directionality and sent to other drying zones.

It is noted that at times directional structures 348 may not be made up of independent air conduits. Indeed, gaps between physical structures of printing device 300 may form the physical structure used to direct drying energy towards drying zones. For instance, there may be an air gap between external surfaces of printing fluid reservoirs and surfaces of other internal components that may lead towards a gap between printhead 342 and a structural surface supporting media path 302, by way of illustration. A shutter (e.g., valve 344) may be used to open and close access to this example air gap. In this example, the structural surface supporting media path 302 may include perforations through which heated and/or dried air may travel into a desired drying zone (e.g., post-divert drying zone 328).

Valve 344 refers to a structural component comprising one or more physical components to regulate flow of drying energy towards drying zones. In one implementation in which drying mechanism 322 comprises an air-based dryer, valve 344 comprises a shutter including one or more openings to direct air towards selected directional structures of directional structures 348. The shutter may move in response to signals received from a controller of printing device 300 (e.g., based on parameters of a print job). Other valve mechanisms are also contemplated by claimed subject matter.

Examples in which drying mechanism 322 comprises an air-based dryer include an air intake 350 via which air may be received from external to printing device 300. Drying mechanism 322 may be in fluid communication with the environment surrounding printing device 300 via air intake 350. A mechanism, such as a fan may be part of air intake 350 to facilitate air capture and introduction.

Additionally, there may be a desire to reuse air already within printing device 300. Thus, an air recirculation path 338 may be included to direct heated air back into drying mechanism 322 for further use. Air in air recirculation path 338 may have been cooled, and thus drying mechanism 322 may warm it back up. Air in air recirculation path 338 may also be more humid than desirable. Thus, drying mechanism 322 may also act to remove humidity from air entering drying mechanism 322 from air recirculation path 338 and/or air intake 350, such as based on an internal humidity determination (e.g., as enabled by the controller and a humidity sensor).

It is to be understood that even though FIG. 3 does not illustrate a controller, such as controller 110 in FIG. 1, a controller is present and enables the functionality discussed above.

With the foregoing in mind, in operation, printing device 300 may comprise a liquid ejection printing device (e.g., an inkjet printer) including a media path (e.g., media path 302), a plurality of distinct drying zones arranged along the media path, at least one drying mechanism (e.g., drying mechanism 322) and directional structures (e.g., directional structures 348) arranged between the at least one drying mechanism and the plurality of distinct drying zones, and a controller (e.g., controller 110 of FIG. 1). In this example, the plurality of distinct drying zones includes at least a pre-divert drying zone (e.g., pre-divert drying zone 326), a post-divert drying zone (e.g., post-divert drying zone 328), and an eject drying zone (e.g., eject drying zone 330). And the controller is to receive a print job having parameters and select a directionality of the at least one drying mechanism with respect to the plurality of distinct drying zones via a corresponding directional structure of the directional structures based upon the parameters of the print job (e.g., print job 112 of FIG. 1). For instance, if the print job contains parameters (e.g., parameters 114 of FIG. 1) indicative of a high printing liquid density value, the controller may select a heightened level of drying energy for the portion of the print job with the high printing liquid density value. For instance, multiple directionalities may be selected, such as using multiple drying mechanisms and/or multiple drying zones.

For instance, if the drying system of printing device 300 comprises an air-based dryer (e.g., drying mechanism 322) and directional structures (e.g., directional structures 348), the output of the air-based dryer is to be directed to the plurality of distinct drying zones via the directional structures based on the received parameters. The directional structures may include air conduits and a valve (e.g., valve 344) to direct air through one or more air conduits. And as discussed, above, the valve or valves may operate in response to signals received from the controller. Additionally, printing device 100 may further include an air intake (e.g., air intake 350) and an air recirculation path (e.g., air recirculation path 338). And the controller will pull air in via the air intake, such as in response to an internal humidity determination.

Figure 4:
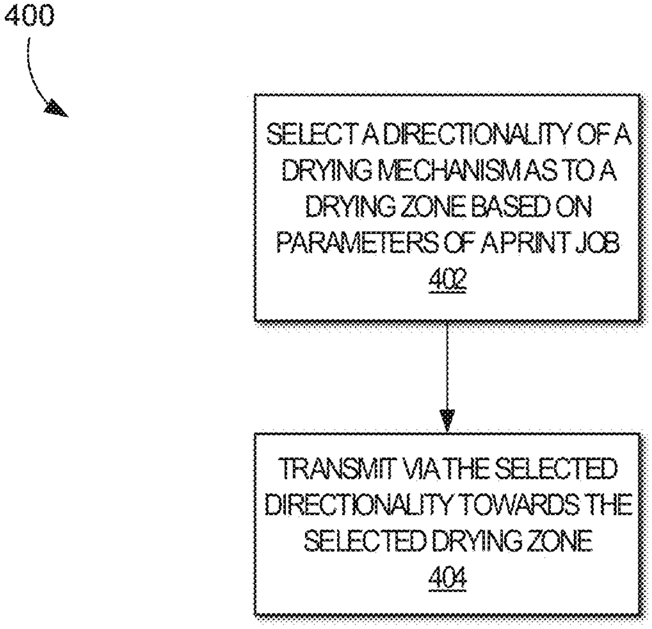
FIG. 4 is a flow chart illustrating an example method.

As discussed above, a number of physical components may operate together to provide drying energy to drying zones of a printing device. Such operation may be enabled by a controller, such as in response to implementing instructions stored in memory. FIG. 4 discusses such operation and provide description of the operation of the device from the perspective of an example method. For course, other methods are enabled by the foregoing structure, and the example method 400 is provided merely by way of example. In this example, method 400 includes selecting a directionality of at least one drying mechanism as to a selected drying zone of a plurality of distinct drying zones based on parameters of a print job, as illustrated at block 402. Thus, using the example of printing device 300 of FIG. 3, it may be the controller that selects a form (e.g., an air-based dryer, an IR dryer, a contact-based dryer, etc.) and a directional structure (e.g., directional structure 346 of directional structures 348) for providing drying energy to drying zones of a media path. For instance, selecting the directionality may include operating a valve (e.g., valve 344 in FIG. 3) to direct air towards a duplex drying zone (e.g., duplex drying zone 332 in FIG. 3) responsive to a duplex print job parameter.

Method 400 also includes transmitting drying energy via the selected directionality towards the selected drying zone, as illustrated at block 404. Thus, if the controller selects an air-based dryer, then the dried air may be transmitted towards the selected drying zone; if the controller selected an IR dryer, then the IR light may be directed (e.g., using wave guides) towards the selected drying zone; if the controller selected a contact-based dryer (e.g., a heated pressure roller), then the contact-based dryer may be moved into position and instructed to provide the desired drying energy to the print media; etc. For instance, in response to the duplex print job parameter described in the preceding paragraph, the functionality described at block 404 may include operating a valve (e.g., valve 344 of FIG. 3) to direct air away from a post-divert drying zone (e.g., post-divert drying zone 328 in FIG. 3).

As described above, there may be a desire to dynamically direct drying energy to distinct drying zones along a media path. And the described drying system and drying mechanism along with corresponding directional structure and drying zones provides an approach for the desired dynamic drying energy direction.

It is noted that the foregoing description uses terms like "and/or," "at least," "one or more," and other like open-ended terms in an abundance of caution. However, this is done without limitation. And unless expressly stated otherwise, singular terms (e.g., "a," "an," or "one" component) are not intended to restrict to only the singular case but are intended to encompass plural cases as well. Similarly, "or" is intended to be open-ended, unless stated otherwise, such that "A or B" may refer to A only, B only, and A and B.

References throughout this specification to one implementation, an implementation, one example, an example, and/or the like means that a particular feature, structure, characteristic, and/or the like described in relation to a particular implementation and/or example is included in at least one implementation and/or example of claimed subject matter. Thus, appearances of such phrases, for example, in various places throughout this specification are not necessarily intended to refer to the same implementation and/or example or to any one particular implementation and/or example. Furthermore, it is to be understood that particular features, structures, characteristics, and/or the like described are capable of being combined in various ways in one or more implementations and/or examples and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A device comprising:

a media path divided into a plurality of distinct drying zones;

at least one drying system comprising a plurality of directionalities with relation to the plurality of distinct drying zones; and a controller to select a directionality of the plurality of directionalities based on parameters of a print job.

2. The device of claim 1, wherein the at least one drying system comprises an air-based dryer and directional structures, and output of the air-based dryer is to be directed to the plurality of distinct drying zones via the directional structures.

3. The device of claim 2, wherein the directional structures comprise air conduits and a valve to direct air through one or more air conduits.

4. The device of claim 2 further comprising an air intake and an air recirculation path and wherein the controller is to pull air in via the air intake in response to an internal humidity determination.

5. The device of claim 1, wherein the plurality of distinct drying zones comprise a pre-divert drying zone and wherein to select the directionality by the controller is to selectively activate drying in the pre-divert drying zone based on a duplex parameter of the print job.

6. A liquid ejection printing device comprising:

a media path;

a plurality of distinct drying zones arranged along the media path, the plurality of distinct drying zones comprising at least a pre-divert drying zone, a post-divert drying zone, and an eject drying zone;

at least one drying mechanism and directional structures arranged between the at least one drying mechanism and the plurality of distinct drying zones; and a controller to:

receive a print job having parameters; and select a directionality of the at least one drying mechanism with respect to the plurality of distinct drying zones via a corresponding directional structure of the directional structures based upon parameters of the print job.

7. The liquid ejection printing device of claim 6, wherein in response to a duplex print job parameter indicative of a duplex print job, the controller is to direct drying energy from the at least one drying mechanism away from the post-divert drying zone for a portion of the print job.

8. The liquid ejection printing device of claim 7 further comprising a duplex drying zone and wherein the drying energy to be directed away from the post-divert drying zone is to be diverted to the duplex drying zone.

9. The liquid ejection printing device of claim 6, wherein the post-divert drying zone is at least twice the length as the pre-divert drying zone.

10. The liquid ejection printing device of claim 6, wherein the parameters of the print job include a printing liquid density value and further wherein the controller is to select the directionality to increase or decrease drying based on the printing liquid density value.

11. The liquid ejection printing device of claim 10, wherein the controller is to increase or decrease drying for a sub-portion of a page of the print job.

12. The liquid ejection printing device of claim 6, wherein the at least one drying mechanism comprises an air-based dryer and a plurality of valves are arranged between the air-based dryer and each of the plurality of distinct drying zones, and further wherein the valves are to operate in response to signals received from the controller.

13. A method comprising:

selecting a directionality of at least one drying mechanism as to a selected drying zone of a plurality of distinct drying zones based on parameters of a print job; and transmitting drying energy via the selected directionality towards the selected drying zone.

14. The method of claim 13, wherein the selecting the directionality comprises operating a valve to direct air towards a duplex drying zone responsive to a duplex print job parameter.

15. The method of claim 14 further comprising operating the valve to direct air away from a post-divert drying zone responsive to the duplex print job parameter.

* * * * *